(12) United States Patent
Huang et al.

(10) Patent No.: US 10,423,766 B2
(45) Date of Patent: Sep. 24, 2019

(54) DATA PROTECTION SYSTEM BASED ON USER INPUT PATTERNS ON DEVICE

(71) Applicants:MICROSOFT TECHNOLOGY LICENSING, LLC, Redmond, WA (US); Jerry Huang, Redmond, WA (US); Zhen Liu, Tarrytown, NY (US)

(72) Inventors: Jerry Huang, Redmond, WA (US); Zhen Liu, Tarrytown, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 14/400,529

(22) PCT Filed: Jun. 27, 2014

(86) PCT No.: PCT/CN2014/080945
§ 371 (c)(1),
(2) Date: Nov. 11, 2014

(87) PCT Pub. No.: WO2015/196449
PCT Pub. Date: Dec. 30, 2015

(65) Prior Publication Data
US 2016/0275277 A1    Sep. 22, 2016

(51) Int. Cl.
*G06F 21/31* (2013.01)
*G06F 21/60* (2013.01)
(Continued)

(52) U.S. Cl.
CPC ............ *G06F 21/316* (2013.01); *G06F 21/60* (2013.01); *H04W 12/1206* (2019.01); *G06F 2221/2143* (2013.01); *H04W 12/00508* (2019.01)

(58) Field of Classification Search
CPC .......... G06F 21/31; G06F 21/32; G06F 21/44; G06F 21/36; G06F 21/34
See application file for complete search history.

(56) References Cited

U.S. PATENT DOCUMENTS

| 4,593,384 A | 6/1986 | Kleijne |
| 5,389,738 A | 2/1995 | Piosenka et al. |

(Continued)

FOREIGN PATENT DOCUMENTS

| CA | 2187855 A1 | 6/1997 |
| CN | 1154389 A | 7/1997 |

(Continued)

OTHER PUBLICATIONS

International Search Report and Written Opinion Issued in PCT Application No. PCT/CN2014/080945, dated Mar. 27, 2015, 14 Pages.

(Continued)

*Primary Examiner* — Yonas A Bayou
(74) *Attorney, Agent, or Firm* — Fiala & Weaver P.L.L.C.

(57) ABSTRACT

Methods, systems, and computer program products are provided for protecting data stored on a device based on user input patterns. The device may have one or more types of user interfaces. The user interacts with a user interface of the device according to a pattern. The interaction pattern is monitored, and compared to one or more stored acceptable user interface patterns associated with sensitive data. If the interaction pattern of the user does not match an acceptable user interface pattern, a data protection response assigned to the data is enacted.

20 Claims, 8 Drawing Sheets

US 10,423,766 B2
Page 2

(51) Int. Cl.
*H04W 12/12* (2009.01)
*H04W 12/00* (2009.01)

(56) References Cited

U.S. PATENT DOCUMENTS

| | | |
|---|---|---|
| 5,751,950 A | 5/1998 | Crisan |
| 5,892,906 A | 4/1999 | Chou et al. |
| 6,002,427 A | 12/1999 | Kipust |
| 6,446,085 B1 | 9/2002 | Gusler et al. |
| 6,480,096 B1 | 11/2002 | Gutman et al. |
| 6,513,051 B1 | 1/2003 | Bolosky et al. |
| 6,567,928 B1 | 5/2003 | Lyle et al. |
| 6,609,198 B1* | 8/2003 | Wood ............... G06F 21/31 713/155 |
| 6,681,304 B1 | 1/2004 | Vogt et al. |
| 7,159,120 B2 | 1/2007 | Muratov et al. |
| 7,206,938 B2 | 4/2007 | Bender et al. |
| 7,441,275 B2 | 10/2008 | McCallam et al. |
| 7,454,629 B2 | 11/2008 | Timmermans et al. |
| 7,594,272 B1 | 9/2009 | Kennedy et al. |
| 7,712,147 B2 | 5/2010 | Lenssen et al. |
| 7,774,315 B1 | 8/2010 | Galker |
| 7,791,898 B2 | 9/2010 | Peytavy et al. |
| 8,050,698 B2 | 11/2011 | Seligmann et al. |
| 8,195,939 B2 | 6/2012 | Reinart et al. |
| 8,248,237 B2 | 8/2012 | Fitzgerald et al. |
| 8,261,090 B1 | 9/2012 | Matsuoka |
| 8,370,340 B1 | 2/2013 | Yu et al. |
| 8,468,591 B2 | 6/2013 | Silverstone |
| 8,499,171 B2 | 7/2013 | Mauro, II |
| 8,504,812 B2 | 8/2013 | Shin |
| 8,520,848 B1 | 8/2013 | Liu et al. |
| 8,526,072 B2 | 9/2013 | Singh et al. |
| 8,577,042 B2 | 11/2013 | Worthy |
| 8,613,111 B2 | 12/2013 | Condorelli et al. |
| 8,656,016 B1 | 2/2014 | Bender et al. |
| 8,713,450 B2 | 4/2014 | Garbow et al. |
| 8,732,860 B2 | 5/2014 | Marron |
| 8,826,443 B1 | 9/2014 | Raman et al. |
| 9,003,542 B1 | 4/2015 | MacKay et al. |
| 9,104,886 B1 | 8/2015 | Dolbakian et al. |
| 9,697,375 B2 | 7/2017 | Huang et al. |
| 9,734,352 B2 | 8/2017 | Huang et al. |
| 2003/0051059 A1* | 3/2003 | Zondervan ........... G06Q 10/107 709/250 |
| 2003/0070098 A1 | 4/2003 | Tokita |
| 2004/0044905 A1 | 3/2004 | Heath et al. |
| 2004/0088588 A1 | 5/2004 | Awada et al. |
| 2004/0172562 A1* | 9/2004 | Berger ................. G06F 21/316 726/7 |
| 2004/0187037 A1 | 9/2004 | Checco |
| 2004/0193910 A1 | 9/2004 | Moles |
| 2005/0044338 A1 | 2/2005 | Goss |
| 2005/0044404 A1 | 2/2005 | Bhansali et al. |
| 2005/0166065 A1* | 7/2005 | Eytchison ............... H04L 63/08 713/189 |
| 2005/0198525 A1 | 9/2005 | Trossen et al. |
| 2005/0289358 A1 | 12/2005 | Haselden et al. |
| 2006/0174339 A1* | 8/2006 | Tao ..................... G06F 21/36 726/18 |
| 2006/0206524 A1 | 9/2006 | Maclaurin |
| 2006/0210167 A1 | 9/2006 | Inoue et al. |
| 2006/0220850 A1 | 10/2006 | Bowser et al. |
| 2006/0224898 A1* | 10/2006 | Ahmed ................ G06F 21/316 713/186 |
| 2007/0233667 A1 | 10/2007 | Mani |
| 2007/0250920 A1 | 10/2007 | Lindsay |
| 2007/0255946 A1 | 11/2007 | Kokubun |
| 2008/0022133 A1 | 1/2008 | Sobel et al. |
| 2008/0066187 A1 | 3/2008 | Dive-reclus et al. |
| 2008/0098172 A1 | 4/2008 | Tsang et al. |
| 2008/0172745 A1 | 7/2008 | Reinart et al. |
| 2009/0037720 A1 | 2/2009 | Cho |
| 2009/0064316 A1 | 3/2009 | Liao et al. |
| 2009/0083850 A1* | 3/2009 | Fadell ................... G06F 21/316 726/19 |
| 2009/0144619 A1 | 6/2009 | Best et al. |
| 2009/0222500 A1 | 9/2009 | Chiu et al. |
| 2009/0253408 A1 | 10/2009 | Fitzgerald et al. |
| 2009/0259588 A1 | 10/2009 | Lindsay |
| 2009/0328238 A1 | 12/2009 | Ridewood Glendinning |
| 2010/0005531 A1 | 1/2010 | Largman et al. |
| 2010/0179874 A1 | 7/2010 | Higgins et al. |
| 2010/0180335 A1 | 7/2010 | Smithson |
| 2010/0207721 A1 | 8/2010 | Nakajima et al. |
| 2010/0266162 A1 | 10/2010 | Singh et al. |
| 2010/0269165 A1* | 10/2010 | Chen ................... G06F 21/316 726/7 |
| 2010/0299757 A1 | 11/2010 | Lee |
| 2011/0023115 A1 | 1/2011 | Wright |
| 2011/0145914 A1 | 6/2011 | Zhu |
| 2011/0202999 A1 | 8/2011 | Logan et al. |
| 2012/0036582 A1 | 2/2012 | Little et al. |
| 2012/0047574 A1* | 2/2012 | Kim ..................... G06F 21/32 726/18 |
| 2012/0081392 A1 | 4/2012 | Arthur |
| 2012/0102549 A1 | 4/2012 | Mazzaferri et al. |
| 2012/0131365 A1 | 5/2012 | Tabone et al. |
| 2012/0216001 A1 | 8/2012 | Ramly et al. |
| 2012/0246737 A1* | 9/2012 | Paxton ................ G06F 21/316 726/27 |
| 2012/0246739 A1 | 9/2012 | Mebed |
| 2012/0250862 A1 | 10/2012 | Bosson |
| 2012/0254986 A1 | 10/2012 | Levien et al. |
| 2012/0278905 A1 | 11/2012 | Condorelli et al. |
| 2012/0295708 A1 | 11/2012 | Hernandez-abrego et al. |
| 2012/0297202 A1 | 11/2012 | Gallet et al. |
| 2013/0005443 A1 | 1/2013 | Kosta et al. |
| 2013/0029640 A1 | 1/2013 | Wong et al. |
| 2013/0117867 A1 | 5/2013 | Fung |
| 2013/0182918 A1 | 7/2013 | Kovtun et al. |
| 2013/0191908 A1 | 7/2013 | Klein |
| 2013/0212367 A1 | 8/2013 | Ingalls et al. |
| 2013/0219176 A1 | 8/2013 | Akella et al. |
| 2013/0232584 A1 | 9/2013 | Baentsch et al. |
| 2013/0254831 A1 | 9/2013 | Roach et al. |
| 2013/0265218 A1 | 10/2013 | Moscarillo |
| 2013/0276125 A1* | 10/2013 | Bailey ................ H04L 63/1433 726/25 |
| 2013/0279689 A1 | 10/2013 | Obaidi |
| 2013/0283380 A1 | 10/2013 | Thadikaran et al. |
| 2013/0305351 A1 | 11/2013 | Narendra et al. |
| 2013/0305354 A1 | 11/2013 | King et al. |
| 2013/0307766 A1 | 11/2013 | Amathnadu et al. |
| 2014/0006347 A1 | 1/2014 | Qureshi et al. |
| 2014/0013422 A1 | 1/2014 | Janus et al. |
| 2014/0013576 A1 | 1/2014 | Barnes |
| 2014/0032833 A1 | 1/2014 | Cudak et al. |
| 2014/0033299 A1* | 1/2014 | McGloin ............. G06F 21/60 726/18 |
| 2014/0075493 A1 | 3/2014 | Krishnan et al. |
| 2014/0082745 A1 | 3/2014 | Guedalia et al. |
| 2014/0115690 A1 | 4/2014 | Huang et al. |
| 2014/0123322 A1 | 5/2014 | Hadley |
| 2014/0132392 A1 | 5/2014 | Kady |
| 2014/0143887 A1 | 5/2014 | Marston et al. |
| 2014/0173286 A1* | 6/2014 | Novak ................ G06F 21/316 713/176 |
| 2014/0188804 A1 | 7/2014 | Gokhale et al. |
| 2014/0245015 A1 | 8/2014 | Velamoor et al. |
| 2014/0366159 A1 | 12/2014 | Cohen |
| 2015/0003691 A1 | 1/2015 | Joo et al. |
| 2015/0135260 A1 | 5/2015 | Ilyadis et al. |
| 2015/0148011 A1 | 5/2015 | Chen |
| 2015/0199378 A1 | 7/2015 | Reyntjens |
| 2015/0302194 A1 | 10/2015 | Voelckel et al. |
| 2015/0302207 A1 | 10/2015 | Sprenger et al. |
| 2016/0283698 A1 | 9/2016 | Huang et al. |

(56) References Cited

U.S. PATENT DOCUMENTS

| | | | |
|---|---|---|---|
| 2016/0300074 | A1 | 10/2016 | Huang et al. |
| 2016/0371504 | A1 | 12/2016 | Huang et al. |
| 2017/0116440 | A1 | 4/2017 | Huang et al. |

FOREIGN PATENT DOCUMENTS

| | | | |
|---|---|---|---|
| CN | 1517889 A | * | 8/2004 |
| CN | 1517889 A | * | 8/2004 |
| CN | 1834976 A | | 9/2006 |
| CN | 101026822 A | | 8/2007 |
| CN | 101141721 A | | 3/2008 |
| CN | 101458666 A | | 6/2009 |
| CN | 101470787 A | | 7/2009 |
| CN | 101673249 A | | 3/2010 |
| CN | 102004881 A | | 4/2011 |
| CN | 1729539 B | | 6/2011 |
| CN | 102184359 A | | 9/2011 |
| CN | 102799833 A | | 11/2012 |
| CN | 202795383 U | | 3/2013 |
| CN | 202841292 U | | 3/2013 |
| CN | 103034819 A | | 4/2013 |
| CN | 103037310 A | | 4/2013 |
| CN | 103049284 A | | 4/2013 |
| CN | 103077339 A | | 5/2013 |
| CN | 103218579 A | | 7/2013 |
| CN | 103324875 A | | 9/2013 |
| CN | 103391367 A | | 11/2013 |
| CN | 103402006 A | | 11/2013 |
| CN | 103729363 A | | 4/2014 |
| EP | 2456247 A1 | | 5/2012 |
| GB | 2348568 A | | 10/2000 |
| KR | 20060119572 A | | 11/2006 |
| TW | 200937197 A | | 9/2009 |
| WO | 2009018125 A1 | | 2/2009 |

OTHER PUBLICATIONS

Saevanee, et al., "Authenticating User Using Keystroke Dynamics and Finger Pressure", In 6th IEEE Consumer Communications and Networking Conference, Jan. 10, 2009, 2 pages.
Stanton, et al., "FABS: File and Block Surveillance System for Determining Anomalous Disk Accesses", In Proceedings from the Sixth Annual IEEE SMC Information Assurance Workshop, Jun. 15, 2005, pp. 207-214.
Monrose, et al., "Keystroke Dynamics as a Biometric for Authentication", In Proceedings of Future Generations Computing Systems, vol. 16, No. 4, Mar. 1, 1999, 15 pages.
Seo, et al., "User Input Pattern-based Authentication Method to Prevent Mobile e-Financial Incidents", In Ninth IEEE International Symposium on Parallel and Distributed Processing with Applications Workshops, May 26, 2011, pp. 382-387.
Peacock, et al., "Typing Patterns: A Key to User Identification", In IEEE Security and Privacy vol. 2 Issue 5, Sep. 1, 2004, pp. 40-47.
Maiorana, et al., "Keystroke Dynamics Authentication for Mobile Phones", In Proceedings of the 2011 ACM Symposium on Applied Computing, Mar. 21, 2011, pp. 21-26.
Hu, et al., "Mobile Data Protection Using Handheld Usage Context Matching", In Proceedings of Tenth International Conference on Mobile Data, May 18, 2009, pp. 594-599.
"Search Report Issued in European Patent Application No. 14895916. 6", dated Jan. 24, 2018, 7 Pages.
"Office Action and Search Report Issued in Chinese Patent Application No. 201480047932.X", dated Feb. 2, 2018, 16 Pages.
"Anti-Tamper Capabilities in FPGA Designs", Retrieved From: https://www.altera.com/en_US/pdfs/literature/wp/wp-01066-anti-tamper-capabilities-fpga.pdf, Jul. 1, 2008, 9 Pages.
"Embedded Security", Retrieved From: http://pdfserv.maximintegrated.com/en/pg/EMBEDDED_SECURITY.pdf, Nov. 18, 2012, 8 Pages.
"High-Speed Secure Microcontroller", Retrieved From: https://datasheets.maximintegrated.com/en/ds/DS5240.pdf, Aug. 18, 2003, 3 Pages.
"How to use the M41 ST87W tamper detect and RAM clear", In Proceedings of the DociD01 0159 Rev 5, Oct. 1, 2013, 8 Pages.
"Secure Mobile Computing using Biotelemetries", Retrieved from: http://www.cs.virginia.edu/~acw/SecureMobileComputing/, Dec. 16, 2008, 4 Pages.
"True Crypt—Wikipedia", Retrieved From: https://en.wikipedia.org/w/index.php?title=TrueCrypt&oldid=614464822, Retrieved on: Aug. 28, 2018, 19 Pages.
"Final Office Action Issued in U.S. Appl. No. 14/400,528", dated Sep. 27, 2017, 24 Pages.
"Non Final Office Action Issued in U.S. Appl. No. 14/400,528", dated May 14, 2018, 21 Pages.
"Non Final Office Action Issued in U.S. Appl. No. 14/400,528", dated Apr. 13, 2017, 20 Pages.
"Non Final Office Action Issued in U.S. Appl. No. 14/402,280", dated Mar. 22, 2017, 13 Pages.
"Final Office Action Issued in U.S. Appl. No. 14/402,280", dated Jun. 7, 2018, 6 Pages.
"Non Final Office Action Issued in U.S. Appl. No. 14/402,280", dated Oct. 11, 2017, 12 Pages.
"Non-final Office Action Issued in U.S. Appl. No. 14/402,280", dated Dec. 19, 2016, 15 Pages.
"Final Office Action Issued in U.S. Appl. No. 14/402,982", dated Apr. 28, 2017, 22 Pages.
"Non Final Office Action Issued in U.S. Appl. No. 14/402,982", dated Oct. 5, 2017, 27 Pages.
"Non Final Office Action Issued in U.S. Appl. No. 14/402,982", dated Oct. 6, 2016, 21 Pages.
"Notice of Allowance Issued in U.S. Appl. No. 14/402,982", dated Sep. 14, 2018, 11 Pages.
"Notice of Allowance Issued in U.S. Appl. No. 14/402,982", dated May 9, 2018, 18 Pages.
"Non Final Office Action Issued in U.S. Appl. No. 14/403,024", dated Dec. 9, 2016, 13 Pages.
"Notice of Allowance Issued in U.S. Appl. No. 14/403,024", dated Apr. 10, 2017, 15 Pages.
"Search Report Issued in European Patent Application No. 14895867. 1", dated Jan. 19, 2018, 7 Pages.
"Search Report Issued in European Patent Application No. 14895897. 8", dated Oct. 26, 2017, 8 Pages.
"Office Action Issued in European Patent Application No. 14896252. 5", dated Oct. 17, 2017, 6 Pages.
"First Office Action and Search Report Issued in Chinese Patent Application 201480047891.4", dated Apr. 2, 2018, 16 Pages.
"Second Office Action Issued in Chinese Patent Application No. 201480047891.4", dated Sep. 5, 2018, 7 Pages.
"Second Office Action Issued in Chinese Patent Application No. 201480047932.X", dated Aug. 13, 2018, 12 Pages.
"First Office Action and Search Report Issued in Chinese Patent Application No. 201480047957.X", dated Feb. 23, 2018, 18 Pages.
"Second Office Action Issued in Chinese Patent Application No. 201480047957.X", dated Oct. 19, 2018, 20 Pages.
"First Office Action Issued in Chinese Patent Application No. 201480048056.2", dated Apr. 3, 2018, 14 Pages.
"Office Action Issued in Chinese Patent Application No. 201480048186. 6", dated Jan. 22, 2018, 11 Pages.
"First Office Action Issued in Chinese Patent Application No. 201480048282.0", dated Mar. 23, 2018, 18 pages.
Bo, et al., "Silentsense: Silent User Identification via Touch and Movement Behavioral Biometrics", In Proceedings of the 19th Annual International Conference on Mobile computing & networking, Sep. 30, 2013, 9 Pages.
Costello, et al., "How to Protect Data on Lost or Stolen iPhone", Retrieved From: https://www.lifewire.com/protect-data-on-lost-stolen-phone-2000298, Oct. 30, 2010, 1 Page.
"Physical Tamper Resistance", In Proceedings of the Security Engineering: A Guide to Building Dependable Distributed Systems, Nov. 18, 2012, pp. 277-304.
"International Search Report and Written Opinion Issued in PCT Application No. PCT/CN2014/080935", dated Mar. 30, 2015, 12 Pages.

(56) References Cited

OTHER PUBLICATIONS

"International Search Report and Written Opinion Issued in PCT Application No. PCT/CN2014/080943", dated Mar. 30, 2015, 15 Pages.

"International Search Report and Written Opinion Issued for PCT Patent Application No. PCT/CN2014/080944", dated Mar. 27, 2015, 16 Pages.

"International Search Report and Written Opinion Issued in PCT Application No. PCT/CN2014/080947", dated Mar. 30, 2015, 16 Pages.

"International Search Report and Written Opinion Issued in PCT Patent Application No. PCT/CN2014/080948", dated Mar. 27, 2015, 12 Pages.

Seifert, et al., "Treasurephone: Context-sensitive user data protection on mobile phones", In Proceedings of the 8th International Conference on Pervasive Computing, May 17, 2010, 8 Pages.

"Booting", Retrieved from: https://web.archive.org/web/20181006120533/https://en.wikipedia.org/wiki/Booting, Jan. 5, 2017, 13 Pages.

Yang, et al., "EagleVision: A Pervasive Mobile Device Protection System", In Proceedings of the 6th Annual International Mobile and Ubiquitous Systems: Networking & Services, Jul. 16, 2009, 10 Pages.

"Second Office Action Issued in Chinese Patent Application No. 201480048056.2", dated Jan. 16, 2019, 11 Pages.

"Second Office Action and Search Report Issued in Chinese Patent Application No. 201480048282.0", dated Dec. 4, 2018, 16 Pages.

"Office Action Issued in European Patent Application No. 14895916.6", dated Jan. 25, 2019, 5 Pages.

"Third Office Action Issued in Chinese Patent Application No. 201480047932.X", dated Jan. 25, 2019, 13 Pages.

Frank, et al., "Touchalytics: On the Applicability of Touchscreen Input as a Behavioral Biometric for Continuous Authentication", In Proceedings of the IEEE Transactions on Information Forensics and Security, vol. 8, Issue 1, Jan. 1, 2013, 13 Pages.

"Third Office Action Issued in Chinese Patent Application No. 201480048282.0", dated Apr. 18, 2019, 10 Pages.

"Office Action Issued in European Application No. 14895916.6", dated Mar. 25, 2019, 4 Pages.

"Office Action Issued in Chinese Patent Application No. 201480047932.X", X dated Apr. 28, 2019, 9 Pages.

"Third Office Action Issued in Chinese Patent Application No. 201480048056.2", dated Jul. 16, 2019, 7 Pages.

\* cited by examiner

Enable a user interaction pattern with a user interface to be assigned to the data

DATA PROTECTION SYSTEM BASED ON USER INPUT PATTERNS ON DEVICE

This application is a U.S. national phase of International Application No. PCT/CN2014/080945 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require a particular password or PIN to be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to the device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for protecting data stored on a device based on user input patterns. The device may have one or more types of user interfaces. The user interacts with a user interface of the device according to a pattern. The interaction pattern is monitored, and compared to one or more stored acceptable user interface patterns associated with sensitive data. If the interaction pattern of the user does not match an acceptable user interface pattern, a data protection response assigned to the data is enacted.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
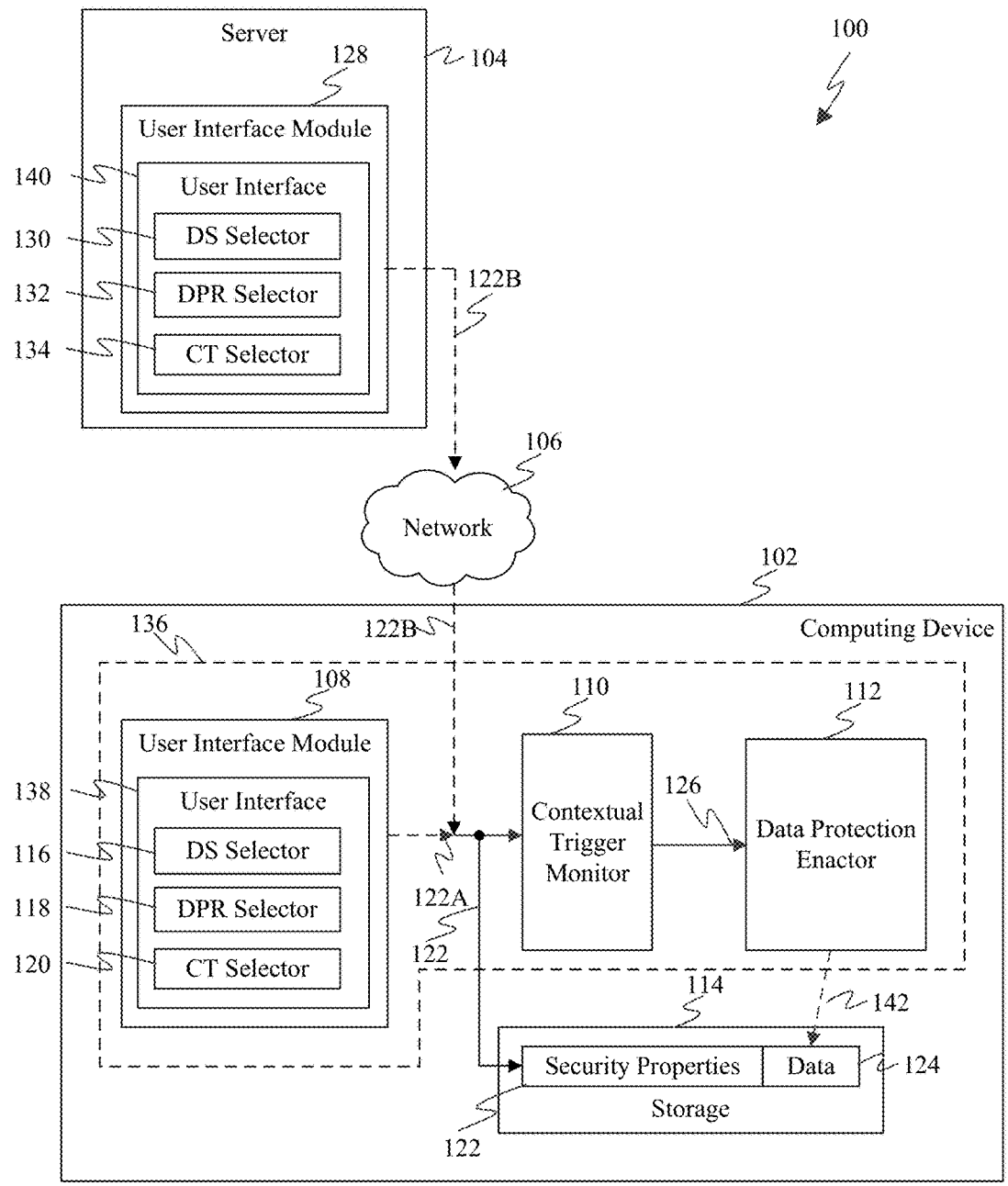
FIG. 1 shows a block diagram of a data protection environment that includes a data protection system configured to protect data stored on a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes exemplary data protection environments that include a computing device that implements contextually triggered data protection. Section III describes an exemplary embodiment where user interface interaction patterns are contextual triggers for data protection. Section IV describes example mobile and desktop device implementations of the computing device. Section V provides some example embodiments. Section VI provides some concluding remarks.

II. Example Embodiments for Contextually Triggered Data Protection

Embodiments described herein enable protection of data stored on devices in a configurable and automatic manner based on context. Context-based data protection enables a user to set up policies to protect data on devices against undesired access, such as in situations where a device has been stolen, where the device is being used against the user's will (e.g., the user has been forced to give out the device password, the device has been taken away while in active operation, etc.), and in other situations. Predefined actions are automatically executed to protect the data when a risky external context is detected so as to prevent the data from being compromised.

Context-based data protection systems guard against access that is unintentionally or unwillingly authorized by users. Data is automatically protected from being compromised when a risky context is identified.

Embodiments for context-based data protection enforcement and execution architectures are provided. An enforcement architecture may be used to define data sensitivity levels (e.g., Level 1, Level 2, etc.), data protection responses (e.g., soft delete, hard delete, etc.), risk/trigger contexts (Context 1, Context 2), and a mapping between these elements (e.g., Level 1→Context 1→soft delete, which indicates that Level 1 content is to be soft deleted when Context 1 is detected). An execution architecture is configured to activate the predefined action/response to ensure the data is protected. Actions such as a "soft delete" (hiding of data) can be recovered from, while a "hard delete" erases data completely without an option for recovery of the data.

In an embodiment, user input patterns on a user interface may be monitored as a contextual trigger for data protection. For instance, data (e.g., one or more files and/or folders) to be protected can be specified, a user interface interaction pattern may be assigned to the data as a contextual trigger, and a data protection response can be assigned to the data that is enacted if the contextual trigger is detected. One or more user interface patterns may be assigned to the data as a contextual trigger, including one or a combination of the following types of patterns:

(A) Keyboarding patterns, such as average typing speed, that are outside of a range of usual keyboarding patterns for a user. Examples of such keyboarding patterns include a usual typing speed range of the user, a usual typing speed for a particular word for the user, usual typographical errors made by the user, and/or other keyboarding patterns that can be an indicator of risky environment;

(B) Mousing patterns (by interaction with a pointing device), such as frequent visits to a particular screen area, which can indicate a risky environment. For example, a unauthorized person that is using a pointing device of a computing device may use the pointing device to interact with home screen/desktop applications or files/folders displayed in a particular screen area that an authorized user may not often interact with. A further example of a mousing pattern indicating risk of authorized access is excess file folder/file exploration in comparison to normal behavior; and (C) Touch screen patterns, such as average touch area size or touch pressure, which are outside of a range of typical touch screen measurements of the user.

Such user interface usage patterns may be provided by a user interacting with an input device (e.g., a keyboard, mouse, touch screen, etc.), and may be constantly analyzed to detect an abnormal pattern.

When a contextual trigger is detected (e.g., an unauthorized user determined to be interacting with a user interface based on their user interface interaction patterns), the data protection response assigned to the sensitive data may be performed. Various possible responses can be taken to protect the data in the event that the contextual trigger is detected. Examples of such data protection responses include one or more of: hard delete, where data marked as sensitive is automatically deleted from the device without any option for recovery; a soft delete, where data marked as sensitive is automatically hidden by the operating system (OS) by deleting the links to the data and storing the links in a safe location (soft deleted data is stored, but not visible by the user, the protected data can be encrypted, etc.); an alert may be provided to the user (e.g., a message, a sound, a visual alert, etc.); a file may be disabled from opening; an opened window displaying the data may be closed; the opened window may be hidden behind other windows; etc.

Note that in embodiments, one or more of such data protections may be performed "discreetly," such that a user handling a device is not aware of the data protection response being performed. For instance, a person handling a device may cause a data protection response to be enacted by tampering with the device (e.g., attempting to open a housing of the device to get at device memory), by failing to enter a passcode or key sequence at the correct time, by transporting the device to a particular location, by interacting with a device UI in an unfamiliar manner, by a biometric condition of the person being sensed, etc. The data protection response may be enacted in a discreet manner, such that the person is unaware that the response is being performed. For instance, the data may be hidden, soft deleted, or hard deleted discreetly, such that the person is not even aware that the data is or was ever present on the device. Additionally, or alternatively, displayed windows may be rearranged before the person has seen the prior arrangement of the windows, an alert may be transmitted to an owner or administrator of the device without the person's knowledge, and/or other data protection responses may be performed in a discreet manner.

Such discreet performance of data protection can have various benefits. For instance, an unauthorized person attempting to access sensitive data on a device may trigger a soft deleting or hiding of that sensitive data. If the unauthorized person is not aware that the data is or was ever present on the device, and does not immediately find the data on the device (because it is hidden or soft deleted), that person may more quickly lose interest in attempting to find the data on the device. Furthermore, if an authorized user of the device is under threat from the unauthorized person, the authorized user has greater plausible deniability as to any presence of the data on the device.

If the data is soft deleted as a data protection response, the data may later be recovered by the OS. When data is soft deleted, only the links to the data (e.g., files) are deleted. The data can be recovered/restored by restoring the links from a safe store. In one embodiment, the restoration of the data can be automatic, such as the next time that the user logs in with the correct password and correct password entering context. Alternatively, the restoration may be triggered by a correct password context.

Accordingly, embodiments provide for features, such as methods and systems for automatic and discreet triggering of data protection against external risky environments in which the user is located, methods and systems for defining sensitive data to be protected via a content attribute, data protection that covers the data on the device for all accounts, and methods and systems for detecting device tampering as the context for activating the data protection response(s).

Further description of data protection embodiments is provided in the following subsections. For instance, the immediately following subsection describes further embodiments for the configuring of protections on data, followed by a subsection that describes further embodiments for the triggering and enactment of data protection.

A. Example Embodiments for Configuring Data Protection

Data protection systems may be configured in various ways to protect data from undesired access, in embodiments. For instance, FIG. 1 shows a block diagram of a data protection environment 100 that includes a data protection system 136 configured to protect data stored on a computing device 102, according to an example embodiment. As shown in FIG. 1, data protection environment 100 includes computing device 102 and a server 104. Computing device 102 and server 104 are communicatively coupled by a network 106. Data protection system 136 is included in computing device 102. In the embodiment of FIG. 1, data protection system 136 includes a user interface module 108, a contextual trigger monitor 110, a data protection enactor 112, and storage 114. Furthermore, server 104 includes a user interface module 128. The features of environment 100 are described as follows.

As shown in FIG. 1, data protection system 136 may be implemented in computing device 102. Note that in another embodiment, data protection system 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface 128 of server 104 may be part of data protection system 136 along with contextual trigger monitor 110 and data protection enactor 112. In another embodiment, both of user interfaces 108 and 128 may be present and part of data protection system 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 114 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Data 124 shown stored in storage 114 may be any type of data, including one or more files, one or more folders, a combination of files and folders, and/or any other type of data structure and/or number of data structures. Although a single instance of data (data 124) is shown stored in storage 114, the single instance of data is shown in FIG. 1 for ease of illustration. It is to be understood that any number of instances of data may be stored in storage 114, with each instance being one or more files and/or folders of any size having corresponding security parameters configured as disclosed herein.

Examples of network 106 include a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

A user may interact with user interface module 108 (when present) at computing device 102, or may interact with user interface module 128 (when present) at server 104, to configure data protection for data stored by computing device 102, such as data 124 stored in storage 114. The user that configures the data protection may be an owner or other user of computing device 102, a system administrator (e.g., when computing device 102 is a device of an enterprise), or other person.

User interface module 108 at computing device 102 may be present as a convenient way for a user of computing device 102 to configure protection for data stored in computing device 102. User interface module 108 may be part of a data protection application stored in computing device 102 (e.g., a standalone desktop or mobile application, an "app" that is partially cloud-based, etc.), may be part of an OS of computing device 102, or may be present and configured in computing device 102 in another manner.

When interacting with a user interface generated by user interface module 108, a user may be enabled to determine stored data in storage 114, such as data 124, to select such data for data protection configuration. The user may interact with the user interface to configure data protection for data 124, and may store the data protection configuration in association with data 124 as security properties 122.

In another embodiment, it may be desired to not have user interface module 108 in computing device 102. For instance, it may be determined to be a security weakness if any person who obtains and is able to log into computing device 102 has access to user interface 108, and therefore can configure (including remove) protections for data stored at computing device 102. In such an embodiment, user interface module 108 may not be present at computing device 102, and instead, user interface module 128 may be present at server 104 to be used to configure protection for data stored in computing device 102. For example, user interface module 128 may be part of a data protection application (or the OS) stored in server 102 that is not network accessible, may be part of a network accessible application (e.g., a browser accessible application), or may be present and configured in server 104 in another manner.

When interacting with a user interface generated by user interface module 128 of server 104, a user may be enabled to determine stored data at computing device 102 through network 106, such as data 124, to select such data for data protection configuration. The user may interact with the user interface to configure data protection for data 124, and may store the data protection configuration in association with data 124 as security properties 122.

Figure 2:
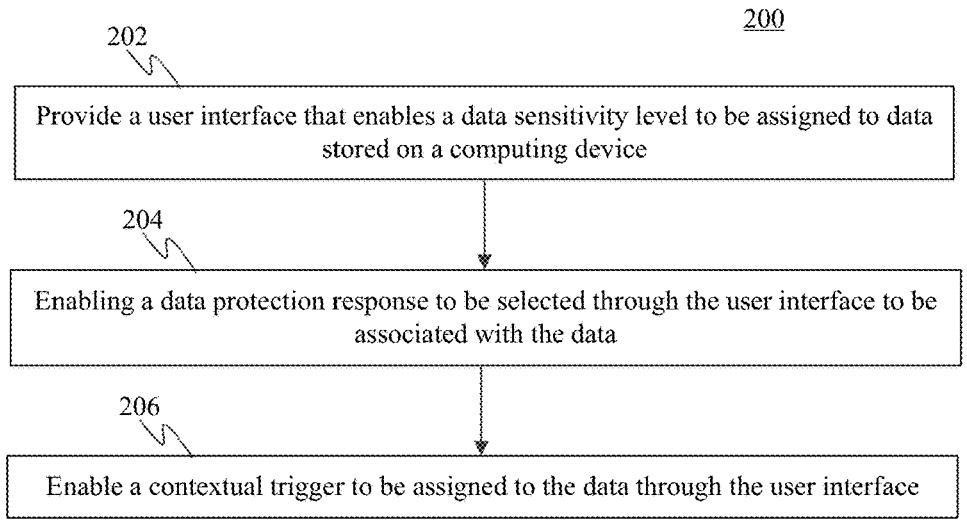
FIG. 2 shows a flowchart providing a process for configuring protection for stored data, according to an example embodiment.

User interface module 108 and/or user interface module 128 may be used to configure data protection in any manner, in embodiments. For instance, in an embodiment, user interface module 108 and/or user interface module 128 may operate according to FIG. 2. FIG. 2 shows a flowchart 200 providing a process for configuring protection for stored data, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, a user interface is provided that enables a data sensitivity level to be assigned to data stored on a computing device. For example, as shown in FIG. 1, user interface module 108 (when present) may generate a user interface 138, and user interface module 128 (when present) may generate a user interface 140. User interface 138 and user interface 104 may each be any type of user interface that includes any number of user interface elements, including a graphical user interface, a touch interface, a voice control interface, a haptic interface, a gesture interface, etc.

In an embodiment, user interface 138 and/or user interface 140 may be provided to enable a data sensitivity level to be assigned to data stored on computing device 102, such as data 124. As shown in FIG. 1, user interface 138 includes a first data sensitivity (DS) selector 116, and user interface 140 includes a second DS selector 130. DS selector 116 and/or DS selector 130, depending on which is present, may be interacted with by a user to assign a data sensitivity level to data 124. For instance, DS selector 116 and/or DS selector 130 may be a user interface element such as a checkbox, a toggle switch, a button, a pull down menu, or another user interface element. The user may interact with the user interface element to select a data sensitivity for data 124. For example, a user may interact with DS selector 116 or DS selector 130 to designate selected data as either sensitive or non-sensitive. In an embodiment, a user may also interact with DS selector 116 or DS selector 130 to designate selected data as having differing degrees of sensitivity (e.g., not sensitive, moderately sensitive, highly sensitive, etc.).

In step 204, a data protection response is enabled to be selected through the user interface to be associated with the data. In an embodiment, user interface 138 and/or user interface 140 may be provided to enable a data protection response to be assigned to data stored on computing device 102, such as data 124. The data protection response is to be enacted with regard to the data in the event that the data is determined to at least potentially be threatened with undesired or risky access (e.g., computing device 102 is misplaced, is potentially stolen, is known to have been stolen, is potentially being accessed by an unauthorized person, a user of computing device 102 is being forced to access the data, etc.).

As shown in FIG. 1, user interface 138 includes a first data protection response (DPR) selector 118, and user interface 140 includes a second DPR selector 132. DPR selector 118 and/or DPR selector 132, depending on which is present, may be interacted with by a user to assign a data protection response to data 124. For instance, DPR selector 118 and/or DPR selector 132 may be any type of user interface element disclosed herein or otherwise known. The user may interact with the user interface element to select a data protection response for data 124. Various types of data protection responses may be available for selection and assignment to data 124.

Figure 3:
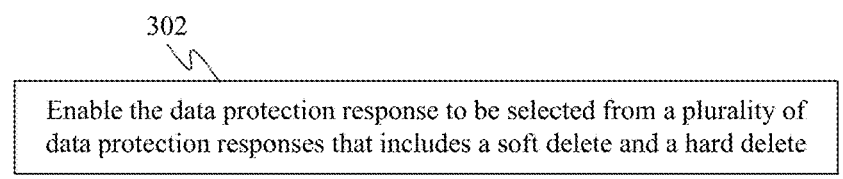
FIG. 3 shows a process for selecting a data protection response for data, according to an example embodiment.

For instance, in an embodiment, step 204 of flowchart 200 may include a process shown in FIG. 3. FIG. 3 shows a step 302 for selecting a data protection response for data, according to an example embodiment. In step 302, the data protection response is enabled to be selected from a plurality of data protection responses that includes a soft delete and a hard delete. Thus, in an embodiment, DPR selector 118 and/or DPR selector 132 may provide a list of data protection responses, and one or more of the data protection responses may be selected from the list and assigned to the data (e.g., by a pull down menu, checkboxes, etc.). The data protection response may comprise hard deleting the data or soft deleting the data. As will be discussed in more detail herein, a "hard delete" comprises rendering data permanently inaccessible (e.g., overwriting the data in memory/storage), while a "soft delete" comprises rendering the data temporarily inaccessible such that it may be recovered at a subsequent time.

Figure 4:
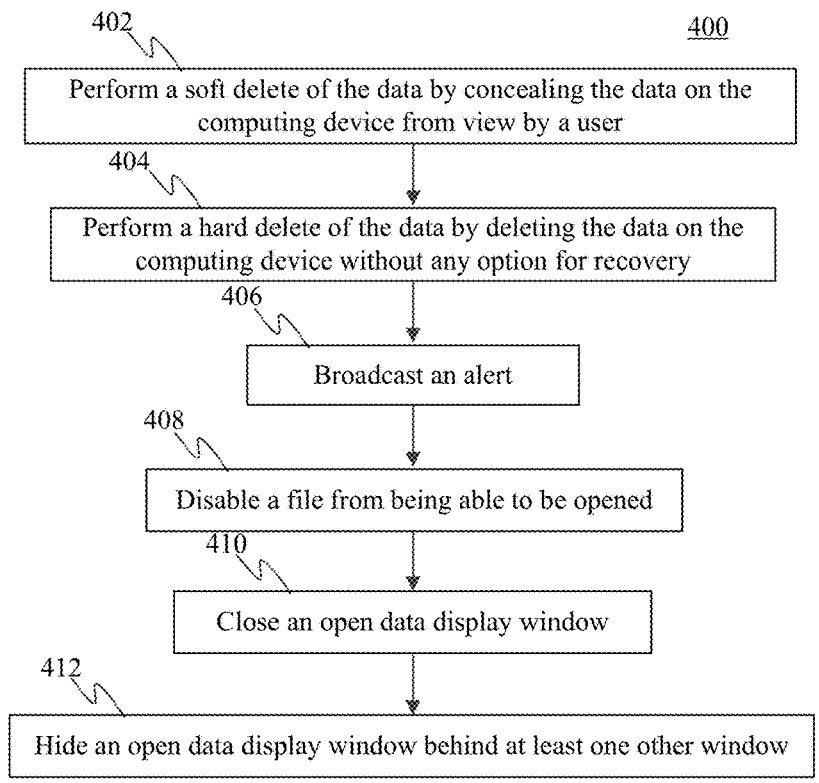
FIG. 4 shows a flowchart that is a list of selectable data protection responses, according to an example embodiment.

Further types of data protection responses may be selected from. For instance, FIG. 4 shows a flowchart 400 providing a process for selectable data protection responses, according to an example embodiment. Each step of flowchart 400 describes a separate and independent data protection response. Any one or more of the data protection responses described in flowchart 400 may be selected and assigned to a particular instance of data. Flowchart 400 is described as follows. Further structural and operational embodiments will be apparent to persons skilled in the relevant art(s) based on the following description.

Flowchart 400 begins with step 402. In step 402, a soft delete of the data is performed by concealing the data on the computing device from view by a user. As described above, DPR selector 118 and/or DPR selector 132 may provide an option for a soft delete to be assigned as a data protection response for data. According to a soft delete, the data is concealed on computing device 102 from view by a user. For instance, links to a file that represents the data may be deleted, and the links and/or data may be stored in a location considered safe for possible later recovery/restoration.

In step 404, a hard delete of the data is performed by deleting the data on the computing device without any option for recovery. As described above, DPR selector 118 and/or DPR selector 132 may provide an option for a hard delete to be assigned as a data protection response for data. According to a hard delete, the data is deleted from storage (e.g., storage 114) in a manner that the data cannot be recovered or restored. For instance, the storage location where the data was stored may be overwritten with a pattern of ones and zeroes.

In step 406, an alert is broadcast. In an embodiment, DPR selector 118 and/or DPR selector 132 may provide an option for an alert to be assigned as a data protection response for data. An alert may be configured to notify an authorized user of computing device 102 (e.g., the owner, a system administrator, etc.) that the data may be threatened with unauthorized access. The alert may be delivered/transmitted to an address of phone number of the authorized user, or presented in another form, including as an email message, a text message, a social network message, a phone call, a beeping noise (or other sound), etc.

In step 408, a file is disabled from being able to be opened. In an embodiment, DPR selector 118 and/or DPR selector 132 may provide an option for disabling one or more files (representing data) from being able to be opened as a data protection response for the data. The file(s) may be disabled from being opened in any manner, including by locking the file(s), increasing permissions on the file(s) (above the access rights of the user), etc.

In step 410, an open data display window is closed. In an embodiment, DPR selector 118 and/or DPR selector 132 may provide an option for closing an open display window that displays data as a data protection response for the data.

In step 412, an open data display window is hidden behind at least one other window. In an embodiment, DPR selector 118 and/or DPR selector 132 may provide an option for hiding an open display window behind one or more other windows as a data protection response for the data. For instance, the data display window may be moved behind one or more other windows that are already open, and/or one or more new windows may be opened in front of the data display window.

Note that, as described herein, DPR selector 118 and/or DPR selector 132 may be interacted with to assign a data protection response to data. In another embodiment, a data protection response may be pre-associated with a data sensitivity, and when the data sensitivity level is assigned to particular data, the associated data protection response is also assigned to the data. For instance, a soft delete may be associated with a low data sensitivity level, and a hard delete may be associated with a high data sensitivity level. If a low sensitivity level is assigned to particular data (in step 202 of flowchart 200), the soft delete is also automatically assigned to the particular data (in step 204).

Referring back to FIG. 2, in step 206, a contextual trigger is enabled to be assigned to the data through the user interface. In an embodiment, user interface 138 and/or user interface 140 may be provided to enable a contextual trigger to be assigned to data stored on computing device 102, such as data 124. The contextual trigger may be a condition or set of conditions that, when detected, indicate that computing device 102 has become subject or susceptible to an unauthorized access.

As shown in FIG. 1, user interface 138 includes a first contextual trigger (CT) selector 120, and user interface 140 includes a second CT selector 134. CT selector 120 and/or CT selector 134, depending on which is present, may be interacted with by a user to set a contextual trigger, the detection of which causes a data protection mode to be activated by data protection enactor 112. For instance, CT selector 120 and/or CT selector 134 may be any type of user interface element disclosed herein or otherwise known. The user may interact with the user interface element to select a contextual trigger for data 124. Examples of contextual triggers include but are not limited to: sensing that unauthorized users are in close proximity to computing device 102; tampering with computing device 102; failure of a user to provide required input during device boot-up, login, or shut down; and sensed behaviors of a user of computing device 102 indicating that the user is not an authorized user, such as detected user interface interaction patterns. A wide variety of other contextual triggers may be used as well.

As described above, the sensitivity level, data protection response, and contextual trigger may be selected for assignment to data 124. Selections of sensitivity level, data protection response, and contextual trigger made at computing device 102 are output from user interface module 108 as security properties 122A. Selections of sensitivity level, data protection response, and contextual trigger made at server 104 are output from user interface module 128 as security properties 122B, and are transmitted in a communication signal over network 106 to computing device 102. Security properties 122A or 122B may be stored in association with data 124 as security properties 122.

B. Example Embodiments for Triggering and Enacting Data Protection

Figure 5:
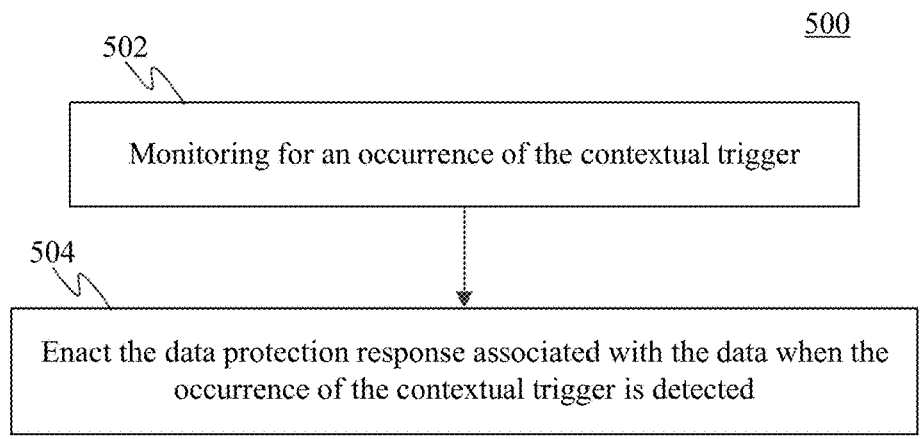
FIG. 5 shows a flowchart providing a process for monitoring a contextual trigger associated with data to trigger enactment of a data protection response, according to an example embodiment.

Data protection systems may be configured in various ways to monitor for data threatened with unauthorized access, and to enact data protection policies to protect the data. For instance, as described above with respect to FIG. 1, data protection system 136 in computing device 102 includes contextual trigger monitor 110 and data protection enactor 112. Contextual trigger monitor 110 and data protection enactor 112 are configured to detect unauthorized access of data, and to enact data protection. Contextual trigger monitor 110 and data protection enactor 112 are described as follows with respect to FIG. 5. FIG. 5 shows a flowchart 500 providing a process for monitoring a contextual trigger associated with data to trigger enactment of a data protection response, according to an example embodiment. Flowchart 500, contextual trigger monitor 110 and data protection enactor 112 are described as follows. Further structural and operational embodiments will be apparent to persons skilled in the relevant art(s) based on the following description.

Flowchart 500 begins with step 502. In step 502, an occurrence of the contextual trigger is monitored for. For example, as shown in FIG. 1, contextual trigger monitor 110 receives the contextual trigger(s) of security properties 122 associated with data 124. Contextual trigger monitor 110 may receive the contextual trigger(s) of security properties 122 directly from user interface module 108 or from storage 114. Contextual trigger monitor 110 operates over time to determine if any of the contextual trigger(s) have been detected. If contextual trigger monitor 110 determines that a contextual trigger has been detected, then contextual trigger monitor 110 notifies data protection enactor 112 by generating a trigger notification 126.

In step 504, the data protection response associated with the data is enacted when the occurrence of the contextual trigger is detected. In response to trigger notification 126, data protection enactor 112 may enact the data protection response(s) in security properties 122 associated with data 124. The enacted data protection response is illustrated as enacted action 142 in FIG. 1.

In embodiments, the data protection response in security properties 122 may indicate, and data protection enactor 112 may enact, any one or more data protection responses mentioned herein or otherwise known. For example, the data protection response may indicate and data protection enactor 112 may enact any one or more of the data protection responses shown in flowchart 400 (FIG. 4) and described elsewhere herein, and/or any other suitable data protection responses that would be apparent to persons skilled in the relevant art(s) based on the teachings herein. Accordingly, data protection enactor 112 may include or access functionality for performing one or more data protection responses. For instance, data protection enactor 112 may include or access a file manager module capable of performing soft deletes of files and/or folders (which may include file encryption, file/folder moving and/or renaming, reconfiguring links to files/folders, etc.). Data protection enactor 112 may include or access a messaging module configured to send alert messages (e.g., a texting tool, an email tool, an instant messaging tool, a social network messaging tool, a phone communication tool, an audio tool, etc.). In another example, data protection enactor 112 may include or access a window management module (e.g., of an OS) capable of rearranging displayed windows and/or opening windows. Data protection enactor 112 may be configured with additional and/or alternative functionality for performing one or more data protection responses, as would be apparent to persons skilled in the relevant art(s) based on the teachings herein.

Figure 6:
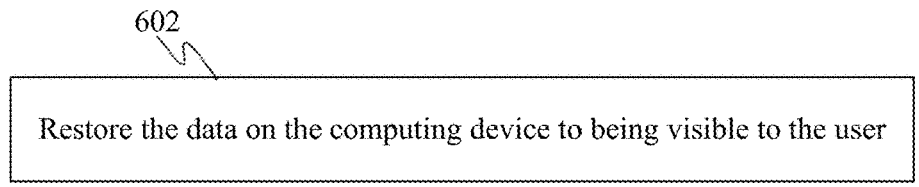
FIG. 6 shows a process for restoring data that was deleted according to a soft delete, according to an example embodiment.

Accordingly, in embodiments, data protections may be triggered for data stored on a device based on context, such as unwanted tampering with the device, etc. Examples of such data protections include soft deletes, hard deletes, alerts, etc. It is noted that if data is soft deleted, the data may be restored once it is determined that the threat of unauthorized data access has diminished or passed. Accordingly, FIG. 6 shows a process for restoring data that was deleted according to a soft delete, according to an example embodiment. In step 602, the data is restored on the computing device to being visible to the user. In such an embodiment, data that was previously soft deleted or hidden in the device may be restored or recovered. For instance, the links to the data file(s) can be restored from a safe location in storage, etc. The restoration can be automatic, such as a next time that the authorized user logs into computing device 102 with a correct password and correct password entering context. Alternatively, the restoration may be triggered only in a manual fashion, such as by being triggered by password context.

III. Example Embodiments for User Interface Interaction Patterns as Triggers for Data Protection As described above, particular data may be selected for protection. For instance, with reference to FIG. 1, a user may interact with user interface module 108 (computing device 102) or user interface module 128 (server 104) to configure security parameters for data. A data sensitivity level may be assigned to the data (e.g., step 202 in FIG. 2), and a data protection response may be assigned to the data (e.g., step 204 in FIG. 2). In an embodiment, a user interface interaction pattern may be assigned to be a contextual trigger (e.g., in step 206 of FIG. 2). If a user interface of computing device 102 is being interacted with by a person trying to gain unauthorized access to data, the interaction pattern of that person may be detected and used to trigger a data protection response.

Figure 7:
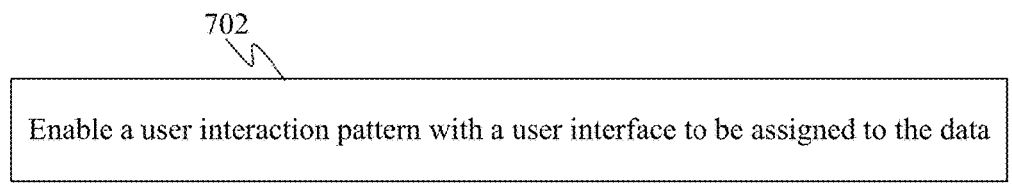
FIG. 7 shows a process for assigning a user interface interaction pattern to data as a contextual trigger, according to an example embodiment.

For instance, FIG. 7 shows a step 702 for configuring a contextual trigger, according to an example embodiment. In step 702, a user interaction pattern with a user interface is enabled to be assigned to the data. Accordingly, a user interaction pattern that is indicative of a person attempting unauthorized access of data may be assigned as a contextual trigger. For example, when a person interacts with a user interface of computing device 102 in an unusual way (e.g., typing faster or slower than an authorized user, touching a touch screen with different sized touch areas than the authorized user, using a mouse to visit screen locations, folder, etc., not usually visited by the authorized user, etc.), the unusual interaction may be a contextual trigger that is detected, and the selected data protection response may be enacted.

CT selector 120 and/or CT selector 134 may enable a user input interaction pattern to be selected in various ways. For instance, CT selector 120 and/or CT selector 134 may enable a general "user interaction pattern" type of contextual trigger selection to be made. In such case, any user interaction pattern monitoring that is configured in computing device 102 may be performed as a potential contextual trigger for the data. In another embodiment, CT selector 120 and/or CT selector 134 may enable particular user interface types available at computing device 102 (e.g., keyboard, touch screen, pointing device, etc.) and/or particular interaction patterns (e.g., typing speed, particular typical typographical errors, touch area size, etc.) to be individually selected as a contextual trigger.

Figure 8:
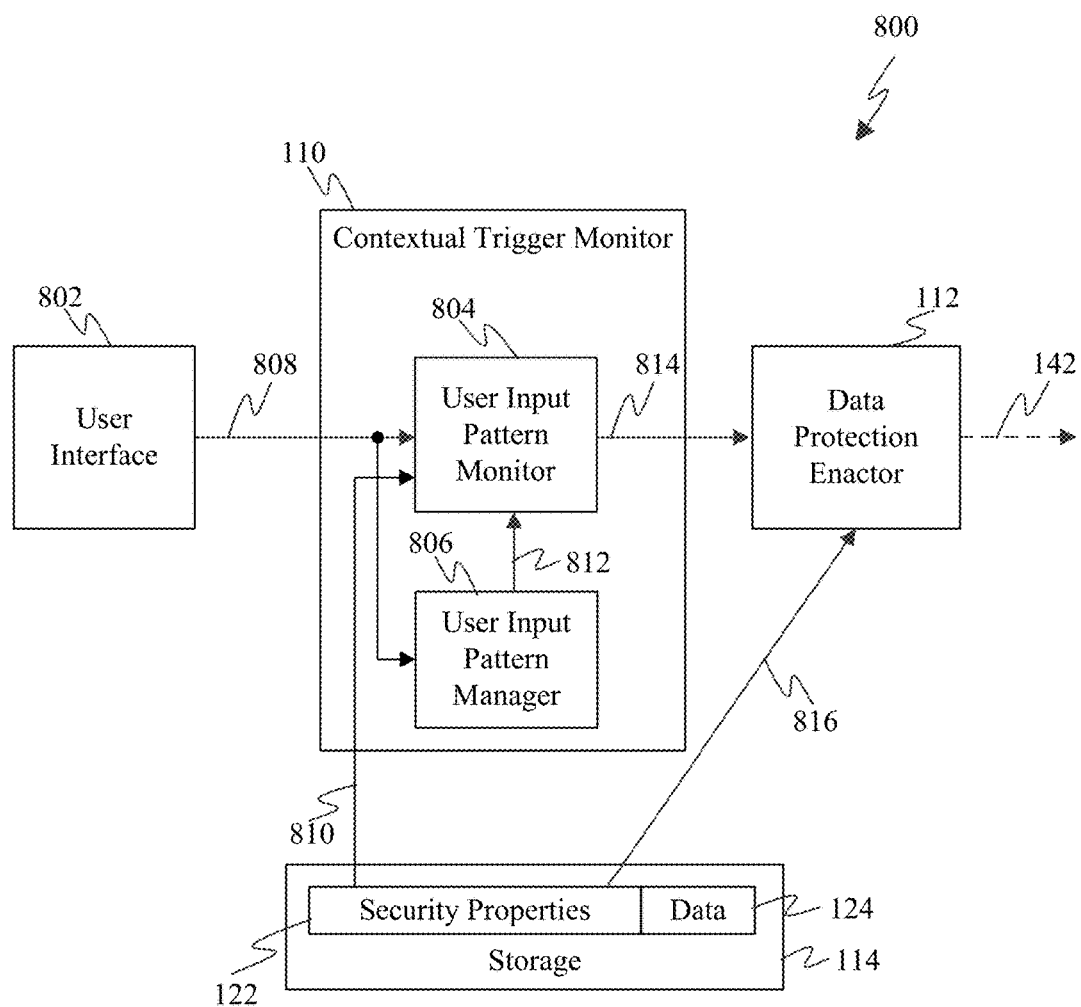
FIG. 8 shows a block diagram of a data protection system configured to use a user interface interaction pattern as a contextual trigger for data protection, according to an example embodiment.

Data protection system 136 may be configured in various ways to monitor user input patterns indicating that data is threatened with unauthorized access. For instance, FIG. 8 shows a block diagram of a data protection system 800 configured to use a user interface interaction pattern as a contextual trigger for data protection, according to an example embodiment. As shown in FIG. 8, data protection system 800 includes a user interface 802, contextual trigger monitor 110, and data protection enactor 112. Storage 114 is also present in FIG. 8. In an embodiment, contextual trigger monitor 110 may perform step 502 of flowchart 500 (FIG. 5), and data protection enactor 112 of security module 802 may perform step 504 of flowchart 500. Data protection system 800 is an example of data protection system 136 shown in FIG. 1, and for ease of illustration, not all features of system 800 are necessarily shown in FIG. 8. Data protection system 800 may be included in computing device 102. Data protection system 800 is described as follows.

In the embodiment of FIG. 8, contextual trigger monitor 110 is configured to use user interaction patterns with a user interface as a contextual trigger for data protection. In particular, as shown in FIG. 8, a user may interact with user interface 802. User interface 802 may generate a user input interaction pattern 808 that indicates the interaction. User input pattern monitor 804 receives user input interaction pattern 808. User interaction contextual trigger 810 of security properties 122 associated with data 124 indicates to user input pattern monitor 804 that one or more types of user interface interaction patterns are contextual triggers assigned to data 124. Accordingly, user input pattern monitor 804 determines whether user input interaction pattern 808 received from user interface 802 indicates that the user is authorized or unauthorized. For instance, user input pattern monitor 804 may compare user input interaction pattern 808 to one or more acceptable user input interaction patterns 812 maintained by user input pattern manager 806. If the user is determined to be unauthorized, user input pattern monitor 804 generates trigger notification 814, which indicates that a user interaction by an unauthorized user is detected. Data protection enactor 112 receives trigger notification 814, and enacts a data protection response 816 associated with data 124.

Figure 9:
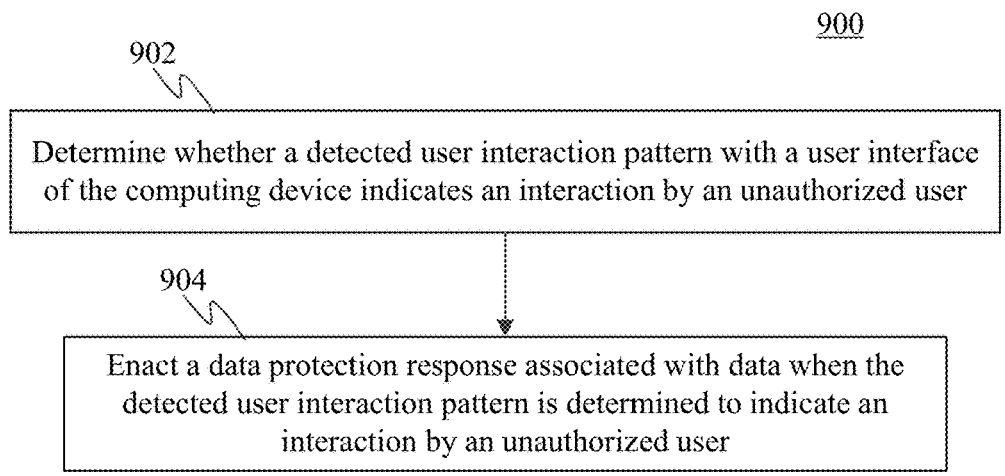
FIG. 9 shows a flowchart providing a process for enacting data protection responses based on user interface interaction patterns, according to an example embodiment.

In an embodiment, data protection system 800 may operate according to FIG. 9. FIG. 9 shows a flowchart 900 providing a process for enacting data protection responses based on user interface interaction patterns, according to an example embodiment. Flowchart 900 is described as follows with respect to FIG. 8.

Flowchart 900 begins with step 902. In step 902, it is determined whether a detected user interaction pattern with a user interface of the computing device indicates an interaction by an unauthorized user. For instance, as described above with respect to FIG. 8, a user may interact with user interface 802. User interface 802 may include any number of user interfaces of computing device 102.

Figure 10:
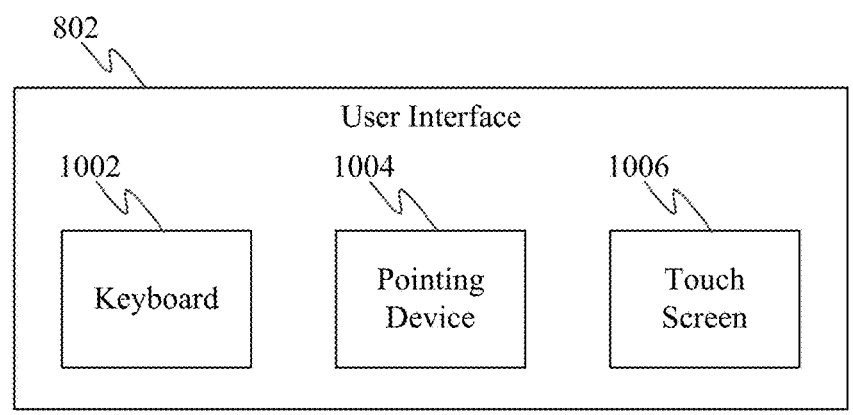
FIG. 10 shows a block diagram of exemplary user interfaces, according to an example embodiment.

For example, FIG. 10 shows a block diagram of various exemplary user interfaces that may be included in user interface 802, according to an example embodiment. As shown in FIG. 10, user interface 802 includes a keyboard 1002, a pointing device 1004, and a touch screen 1006. In embodiments, user interface 802 may include any number of these types of user interfaces and/or other types of user interfaces.

When present, keyboard 1002 may be a physical or virtual keyboard of user interface 802. Keyboard 1002 may include any number and combination of alphanumeric keys, symbol keys, etc., and may have any layout configuration. A user may type on keyboard 1002, and the characters that are submitted by the user may be received by user input pattern monitor 804 in user input interaction pattern 808. User input pattern monitor 804 may be configured to determine various parameters regarding the characters submitted on user input interaction pattern 808, including the particular characters that are submitted, the particular words, an amount of time between successive characters, typographical errors in received words, etc.

When present, pointing device 1004 may be a computer mouse, a touch pad, a pointing stick, a joystick, a trackball, or other pointing device configured to maneuver a pointer (or cursor) on a display screen of computing device 102. Pointing device 1004 may enable a user to perform point, click, and/or drag operations, for example. The operations performed by a user with pointing device 1004 may be received by user input pattern monitor 804 in user input interaction pattern 808. User input pattern monitor 804 may be configured to determine various parameters regarding the point, clock, and/or drag operations indicated by user input interaction pattern 808. For instance, user input pattern monitor 804 may determine/track a screen location in which the pointer is positioned by the user, an amount of time spent by the pointer at the screen location, one or more applications and/or files/folders clicked on, etc.

When present, touch screen 1006 may be a display screen that a user may touch with a stylus or their fingers to interact with displayed content, including selecting content, dragging content, performing touch-related gestures (e.g., spreading two fingers to zoom in, etc.), etc. Touch screen 1006 may be a resistive touch screen, surface acoustic wave (SAW) touch screen, capacitive touch screen, or other type of touch screen. Touch screen 1006 detects and converts an area of contact of the user's finger(s) and/or stylus into touch area data (e.g., pixel data) that indicates an area of touch screen 1006 being touched. The touch area data may be received by user input pattern monitor 804 in user input interaction pattern 808. User input pattern monitor 804 may be configured to determine various parameters regarding the touch area data. For instance, user input pattern monitor 804 may determine/track a screen location in which the finger(s)/stylus are positioned by the user, a touch area size indicative of an amount of the display screen that is being touched by a user's fingers, an amount of time touch contact is being made at the touch area, an amount of touch pressure being applied by the finger(s)/stylus, one or more applications and/or files/folders clicked on, etc.

Accordingly, in an embodiment, user input pattern monitor 804 determines whether a detected user interaction pattern received in user input interaction pattern 808 indicates an interaction by an unauthorized user. For instance, in one embodiment, user input pattern monitor 804 may be perform this determination based on a similarity, or lack of similarity, of the user interaction patterns with historical user interaction patterns received in user input interaction pattern 808 from an authorized user of computing device 102.

For example, as described above, user input pattern manager 806 may maintain (e.g., in storage, such as storage 114) acceptable user interaction patterns for an authorized user of computing device 102. User input pattern manager 806 may receive and/or generate the acceptable user interaction patterns in any manner. For instance, in one embodiment, user input pattern manager 806 may initiate a training phase for an authorized user, where the user interacts with user interface 802 to perform predetermined user interface interactions as directed by user input pattern manager 806 (e.g., typing in a predetermined character sequence, moving a pointer to predetermined screen locations, touching a touch screen at predetermined locations, etc.). User input pattern manager 806 may request that the user repeat the user interface interactions any number of times. User input pattern manager 806 may receive indications of the training phase user interactions with user interface 802 in user interaction pattern 808, may generate averages/ranges for various acceptable user interaction patterns (e.g., typing speed, pointer movement speed and coordination, touch screen area size, etc.), and may store the averages as acceptable user interaction patterns.

In another embodiment, whether or not the training phase is used to generate acceptable user interaction patterns, user input pattern manager 806 may be configured to monitor user interaction pattern 808 over time during routine interactions by the user with user interface 802 (e.g., typing in various character sequences, moving a pointer to various screen locations, touching a touch screen at various locations, etc.) to obtain user interface interaction information that may be used to determine averages/ranges for various acceptable user interaction patterns.

Figure 11:
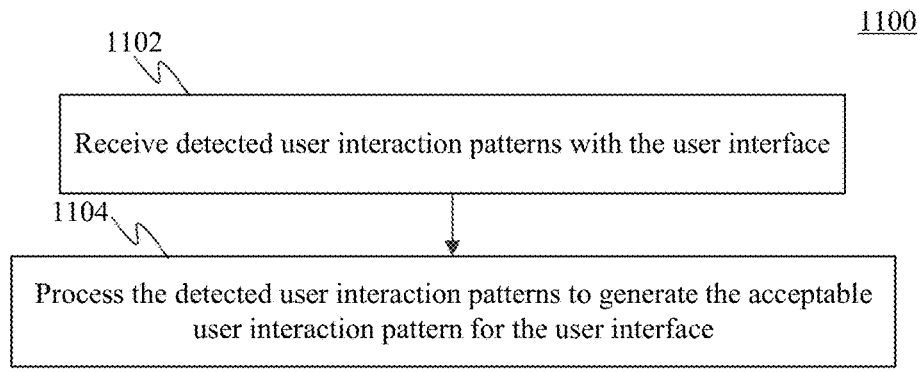
FIG. 11 shows a flowchart providing a processes for determining acceptable user interface interaction patterns, according to an example embodiment.

Thus, in such an embodiment, user input pattern manager 806 may be configured to operate according to FIG. 11. FIG. 11 shows a flowchart 1100 providing a processes for determining acceptable user interface interaction patterns, according to an example embodiment. Flowchart 1100 is described as follows with respect to FIG. 8.

Flowchart 1100 begins with step 1102. In step 1102, detected user interaction patterns with the user interface are received. As described above, user input pattern manager 806 may be configured to monitor user interaction pattern 808 to obtain user interface interaction patterns. User input pattern manager 806 may receive user interaction information in user interaction pattern 808 during a training phase and/or during routine (non-training) usage of user interface 802 by an authorized user.

In step 1104, the detected user interaction patterns are processed to generate the acceptable user interaction pattern for the user interface. In an embodiment, user input pattern manager 806 may process the user interaction patterns received in user interaction pattern 808 based on a training phase and/or routine usage to determine average values and/or ranges for various user interaction parameters that may be used to identify whether an authorized or unauthorized user is interacting with user interface 802.

For instance, with regard to user interaction with a keyboard, user input pattern manager 806 may be configured to calculate an average typing speed for the authorized user, an average typing speed for a particular word for the user, one or more typographical errors frequently made by the user, and/or other averages/ranges for keyboarding patterns by an authorized user. With regard to user interaction with a pointing device, user input pattern manager 806 may be configured to calculate one or more screen locations frequently visited and/or one or more screen locations that are not frequently visited by the pointer (e.g., relative to a middle threshold number of visits) under control of the user, an amount of time spent by the pointer at one or more screen locations, one or more applications and/or files/folders frequently clicked on (e.g., greater than a threshold number of times), and/or other averages/ranges for pointing device patterns by an authorized user. With regard to user interaction with a touch screen, user input pattern manager 806 may be configured to calculate an average touch area size for a finger of the user (which is indicative of a finger size of an authorized user), an average touch pressure by a finger of the user, and/or other averages/ranges for touch screen patterns by an authorized user.

Note that although a keyboard, pointing device, and touch screen are provided as examples of user interfaces, in other embodiments, other types of user interfaces may additionally and/or alternatively be present in user interface 802, including a voice and/or speech input interface (e.g., a microphone), a gesture interface (e.g., one or more image sensors, etc., that sense hand gestures, etc.), a motion tracking interface (e.g., one or more image sensors, etc. that sense body motions, etc.), etc. User input pattern monitor 804 and user input pattern manager 806 may be configured to receive user interaction patterns, as well as determine averages/ranges for acceptable user interaction patterns provided by these or other user interface types, as would be apparent to persons skilled in the relevant art(s) based on the teachings herein. Such user interaction patterns may be used to determine whether an authorized or unauthorized user is interacting therewith, in embodiments.

As shown in FIG. 8, user input pattern manager 806 generates one or more acceptable user interaction patterns 812. User input pattern monitor 804 receives acceptable user interaction pattern(s) 812. In an embodiment, user input pattern monitor 804 may be configured to determine whether a detected user interaction pattern from user interface 802 indicates an interaction by an unauthorized user based on a similarity, or lack of similarity, with historical user interaction patterns indicated in acceptable user interaction pattern(s) 812.

Figure 12:
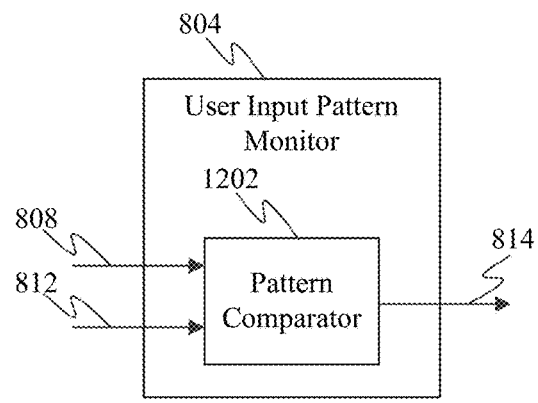
FIG. 12 shows a block diagram of a user input pattern monitor, according to an example embodiment.

In particular, in an embodiment, user input pattern monitor 804 may be configured according to FIG. 12. FIG. 12 shows a block diagram of user input pattern monitor 804, according to an example embodiment. As shown in FIG. 12, user input pattern monitor 804 includes a pattern comparator 1202. In an embodiment, pattern comparator 1202 is configured to compare a detected user interaction pattern received in user interaction pattern 808 with acceptable user interaction pattern(s) 812 to determine whether an unauthorized person is interacting with user interface 802.

Figure 13:
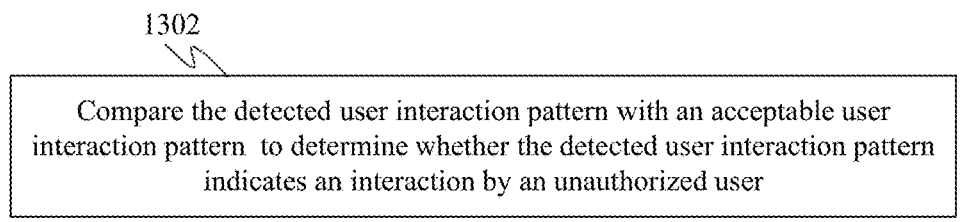
FIG. 13 shows a process for determining whether a detected user interaction pattern is acceptable, according to embodiments.

For instance, in an embodiment, pattern comparator 1202 may be configured to operate according to FIG. 13. FIG. 13 shows a step 1302 for determining whether a detected user interaction pattern is acceptable, according to embodiments. In step 1302, the detected user interaction pattern is compared with an acceptable user interaction pattern to determine whether the detected user interaction pattern indicates an interaction by an unauthorized user. As shown in FIG. 13, pattern comparator 1202 compares a detected user interaction pattern received in user interaction pattern 808 with acceptable user interaction pattern(s) 812 to determine whether an unauthorized person is interacting with user interface 802. If pattern comparator 1202 determines that the detected user interaction pattern does not matches an acceptable user interaction pattern, pattern comparator 1202 generates trigger notification 814, which indicates that a user interaction by an unauthorized user is detected. If pattern comparator 1202 determines that the detected user interaction pattern does match an acceptable user interaction pattern, an authorized person is determined to be interacting with user interface 802, and no trigger notification is generated.

Note that in an embodiment, when comparing a detected user interaction pattern received in user interaction pattern 808 with an average, pattern comparator 1202 may provide a range of tolerance for the average, such that the detected user interaction pattern does not exactly have to match the average. For instance, user interaction pattern 808 may detect a typing speed on a keyboard of 63 words per minute, and acceptable user interaction pattern(s) 812 may indicate an average typing speed on the keyboard of 61 words per minute for the authorized user. This indicates the person typing on the keyboard was typing approximately 3.3% faster than the average. Though the values do not exactly match, they may be considered to match within an acceptance tolerance range. In one embodiment, pattern comparator 1202 may provide a wider tolerance for mismatch (e.g., 20%) over a relatively shorter period of time (e.g., a few minutes), while providing a narrower tolerance for mismatch (e.g., 10%) over a relatively longer period of time (e.g., an hour).

In other embodiments, user input pattern monitor 804 may be configured in other ways to determine whether a detected user interaction pattern from user interface 802 indicates an interaction by an unauthorized user.

Referring back to FIG. 9, in step 904, a data protection response associated with data is enacted when the detected user interaction pattern is determined to indicate an interaction by an unauthorized user. In an embodiment, as shown in FIG. 8, data protection enactor 112 receives tamper notification 814 and data protection response(s) 816. Based on tamper notification 814, data protection enactor 112 may enact the data protection response(s) 816 in security properties 122 associated with data 124. Note that in an embodiment, data protection enactor 112 may enact the data protection response "discreetly," such that a user handling computing device 102 is not aware of the data protection response being performed.

Thus, in embodiments, data protections may be triggered for data based on context, such as user interface interactions. Examples of such data protections include soft deletes, hard deletes, alerts, etc. It is noted that if the data is soft deleted, the data may be restored once it is determined that the threat of unauthorized data access has diminished or passed (e.g., step 602 of FIG. 6), such as in the case that the unauthorized person is not successful at accessing the computing device via the user interface, and the computing device is recovered, etc.

Accordingly, in embodiments, data protection may be enacted based on user interactions with a user interface. For example, embodiments provide: a system for enforcing context-based data protection for users using both soft and hard deletes trigged by UI patterns; a method for using keyboarding pattern of a data owner as a means to protecting sensitive data; a method for using special typing (e.g., typographical errors or speed) as a means to trigger data protection mechanisms; a method for using a touch pattern (e.g., area or pressure) of a data owner as a means to protecting sensitive data; a method for using a special mouse UI (such as frequent visits of a particular area on the screen) as a means to trigger data protection mechanisms; and a method for triggering data protection mechanisms through detecting exhaustive file/folder explorations.

IV. Example Mobile and Stationary Device Embodiments

Computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and step 1302 may be implemented in hardware, or hardware combined with software and/or firmware. For example, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and/or step 1302 may be implemented as computer program code/instructions configured to be executed in one or more processors and stored in a computer readable storage medium. Alternatively, computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and/or step 1302 may be implemented as hardware logic/electrical circuitry.

For instance, in an embodiment, one or more, in any combination, of user interface module 108, contextual trigger monitor 110, data protection enactor 112, DS selector 116, DPR selector 118, CT selector 120, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and/or step 1302 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
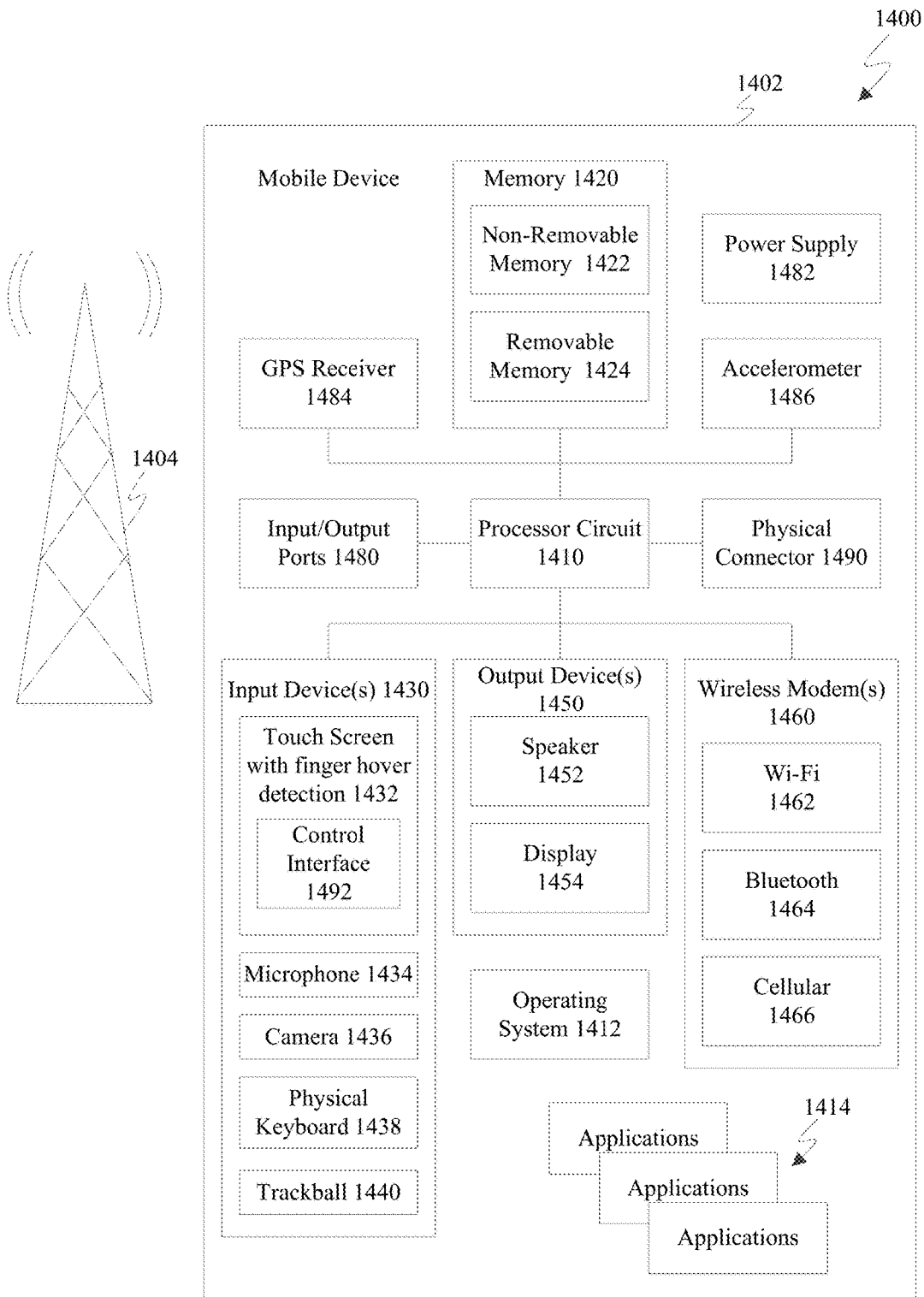
FIG. 14 shows a block diagram of an exemplary user device in which embodiments may be implemented.

FIG. 14 shows a block diagram of an exemplary mobile device 1400 including a variety of optional hardware and software components, shown generally as components 1402. For instance, components 1402 of mobile device 1400 are examples of components that may be included in computing device 102 (FIG. 1) in mobile device embodiments. Any number and combination of the features/elements of components 1402 may be included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor referred to as processor circuit 1410 for performing such tasks as signal coding, image processing, data processing, input/output processing, power control, and/or other functions. Processor circuit 1410 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1410 may execute program code stored in a computer readable medium, such as program code of one or more applications 1414, operating system 1412, any program code stored in memory 1420, etc. Operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and/or step 1302 (including any suitable step of flowcharts 200, 400, 500, 900, 1100), and/or further embodiments described herein.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1432 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 1432 is shown to include a control interface 1492 for illustrative purposes. The control interface 1492 is configured to control content associated with a virtual element that is displayed on the touch screen 1432. In an example embodiment, the control interface 1492 is configured to control content that is provided by one or more of applications 1414. For instance, when a user of the mobile device 1400 utilizes an application, the control interface 1492 may be presented to the user on touch screen 1432 to enable the user to access controls that control such content. Presentation of the control interface 1492 may be based on (e.g., triggered by) detection of a motion within a designated distance from the touch screen 1432 or absence of such motion. Example embodiments for causing a control interface (e.g., control interface 1492) to be presented on a touch screen (e.g., touch screen 1432) based on a motion or absence thereof are described in greater detail below.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice control interface that allows a user to operate the device 1400 via voice commands. Further, device 1400 can comprise input devices and software that allows for user interaction via a user's spatial gestures, such as detecting and interpreting gestures to provide input to a gaming application.

Wireless modem(s) 1460 can be coupled to antenna(s) (not shown) and can support two-way communications between processor circuit 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
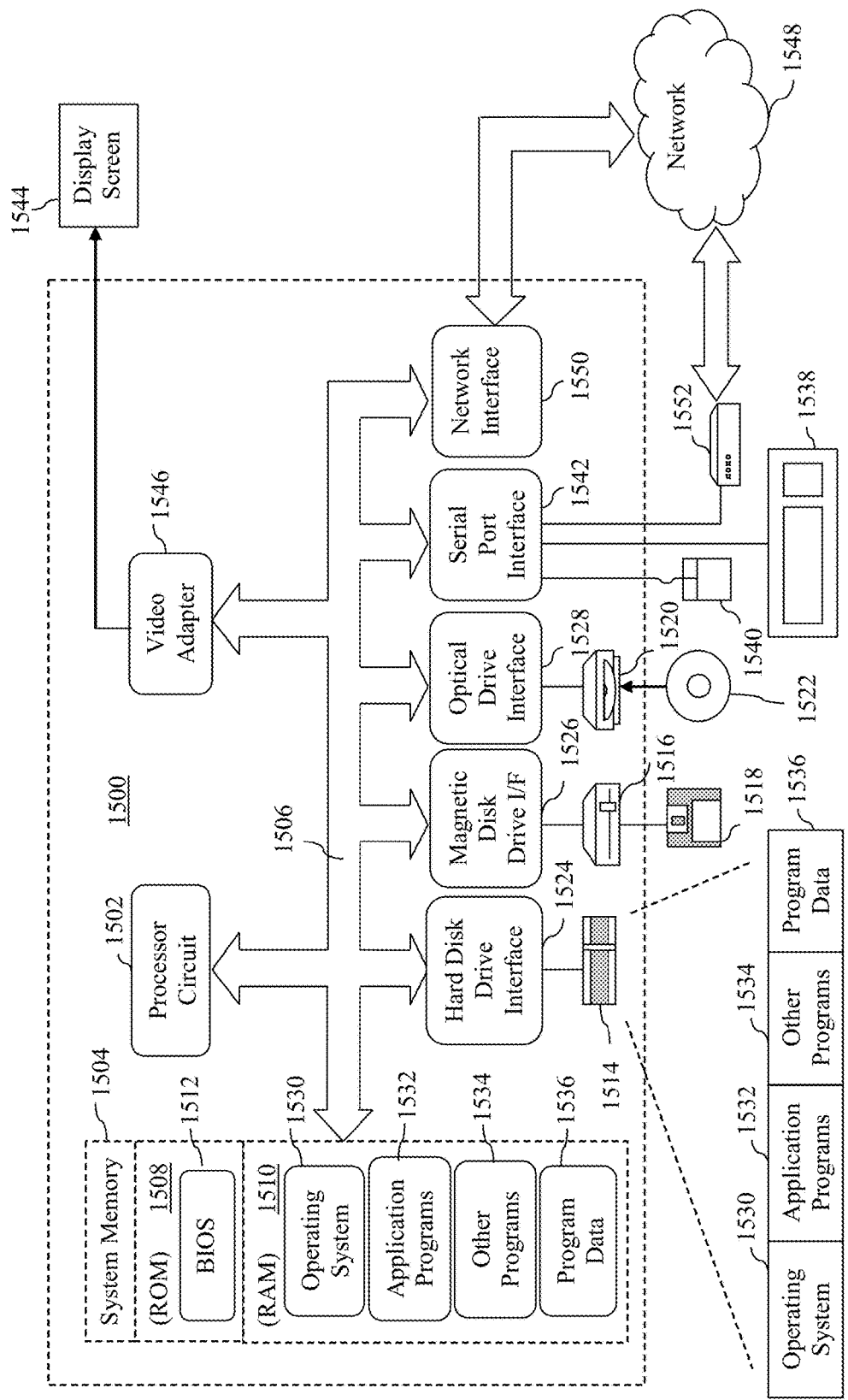
FIG. 15 shows a block diagram of an example computing device that may be used to implement embodiments.

Furthermore, FIG. 15 depicts an exemplary implementation of a computing device 1500 in which embodiments may be implemented. For example, computing device 102 and/or server 104 (FIG. 1) may be implemented in one or more computing devices similar to computing device 1500 in stationary computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, system 800, user input pattern monitor 804, user input pattern manager 806, pattern comparator 1202, flowchart 200, step 302, flowchart 400, flowchart 500, step 602, step 702, flowchart 900, flowchart 1100, and/or step 1302 (including any suitable step of flowcharts 200, 400, 500, 900, 1100), and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including memory 1420 of FIG. 14). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Example Embodiments

In one embodiment, a system in a computing device protects data stored by the computing device. The system comprises a user input pattern monitor configured to determine whether a detected user interaction pattern with a user interface of the computing device indicates an interaction by an unauthorized user, and a data protection enactor configured to discreetly enact a data protection response associated with data when the detected user interaction pattern is determined by the user input pattern monitor to indicate an interaction by an unauthorized user.

In an embodiment of the system, the user input pattern monitor is configured to compare the detected user interaction pattern with an acceptable user interaction pattern to determine whether the detected user interaction pattern indicates an interaction by an unauthorized user.

In an embodiment of the system, the system may further comprise a user input pattern manager configured to receive detected user interaction patterns with the user interface, and to process the detected user interaction patterns to generate the acceptable user interaction pattern for the user interface.

In an embodiment of the system, the user interface is a keyboard.

In an embodiment of the system, the acceptable user interaction pattern for the keyboard includes at least one of an average typing speed range, an average typing speed for a particular word, or a predetermined typographical error.

In an embodiment of the system, the user interface is a pointing device.

In an embodiment of the system, the acceptable user interaction pattern for the pointing device includes at least one of a movement of a pointer within a determined screen area or an amount of file and/or folder exploration less than a predetermined threshold.

In an embodiment of the system, the user interface is a touch screen.

In an embodiment of the system, the acceptable user interaction pattern for the touch screen includes at least one of an average touch area or an average touch pressure range.

In an embodiment of the system, the system may further comprise a user interface module that enables a data sensitivity level, the data protection response, and a contextual trigger to be associated with the data.

In another embodiment, a method in a computing device to protect data stored by the computing device comprises: determining whether a detected user interaction pattern with a user interface of the computing device indicates an interaction by an unauthorized user, and discreetly enacting a data protection response associated with data when the detected user interaction pattern is determined to indicate an interaction by an unauthorized user.

In one embodiment of the method, the determining comprises comparing the detected user interaction pattern with an acceptable user interaction pattern to determine whether the detected user interaction pattern indicates an interaction by an unauthorized user.

In one embodiment of the method, the method further comprises receiving detected user interaction patterns with the user interface, and processing the detected user interaction patterns to generate the acceptable user interaction pattern for the user interface.

In one embodiment of the method, the user interface is a keyboard, and the acceptable user interaction pattern for the keyboard includes at least one of an average typing speed range, an average typing speed for a particular word, or a predetermined typographical error.

In one embodiment of the method, the user interface is a pointing device, and the acceptable user interaction pattern for the pointing device includes at least one of a movement of a pointer within a determined screen area or an amount of file and/or folder exploration less than a predetermined threshold.

In one embodiment of the method, the user interface is a touch screen, and the acceptable user interaction pattern for the touch screen includes at least one of an average touch area or an average touch pressure range.

In another embodiment, a method in a computing device to protect data stored by the computing device comprises: enabling data to be selected, and a data sensitivity level, a data protection response, and a contextual trigger to be associated with the data, receiving detected user interaction patterns with a user interface of the computing device, processing the detected user interaction patterns to generate an acceptable user interaction pattern for the user interface, determining whether a detected user interaction pattern with the user interface indicates an interaction by an unauthorized user by comparison with the acceptable user interaction pattern, and discreetly enacting the data protection response when the detected user interaction pattern is determined to indicate an interaction by an unauthorized user.

In one embodiment of the method, the user interface is a keyboard, and the acceptable user interaction pattern for the keyboard includes at least one of an average typing speed range, an average typing speed for a particular word, or a predetermined typographical error.

In one embodiment of the method, the user interface is a pointing device, and the acceptable user interaction pattern for the pointing device includes at least one of a movement of a pointer within a determined screen area or an amount of file and/or folder exploration less than a predetermined threshold.

In one embodiment of the method, the user interface is a touch screen, and the acceptable user interaction pattern for the touch screen includes at least one of an average touch area or an average touch pressure range.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system in a computing device to protect data stored by the computing device, comprising:
   a user input pattern monitor configured to determine whether a detected user interaction pattern with a user interface of the computing device indicates an interaction by an unauthorized user, the detected user interaction pattern comprising a keyboard user interaction pattern that includes a predetermined typographical error; and a data protection enactor configured to discreetly enact a data protection response associated with data when the detected user interaction pattern is determined by the user input pattern monitor to indicate an interaction by an unauthorized user.

2. The system of claim 1, wherein the user input pattern monitor is configured to compare the detected user interaction pattern with an acceptable user interaction pattern to determine whether the detected user interaction pattern indicates an interaction by an unauthorized user.

3. The system of claim 2, further comprising:
a user input pattern manager configured to receive detected user interaction patterns with the user interface, and to process the detected user interaction patterns to generate the acceptable user interaction pattern for the user interface.

4. The system of claim 2, wherein the user interface further comprises a pointing device.

5. The system of claim 4, wherein the acceptable user interaction pattern for the pointing device includes at least one of a movement of a pointer within a determined screen area or an amount of file and/or folder exploration less than a predetermined threshold.

6. The system of claim 2, wherein the user interface further comprises a touch screen.

7. The system of claim 6, wherein the acceptable user interaction pattern for the touch screen includes at least one of an average touch area or an average touch pressure range.

8. The system of claim 1, further comprising:
a user interface module that enables a data sensitivity level, the data protection response, and a contextual trigger to be associated with the data.

9. A method in a computing device to protect data stored by the computing device, comprising:
determining whether a detected user interaction pattern with a user interface of the computing device indicates an interaction by an unauthorized user, the detect user interaction pattern comprising a pointing device interaction that includes at least one of a movement of a pointer within a determined screen area, an amount of file exploration having a predetermined relationship with a first predetermined threshold, or an amount of folder exploration having a predetermined relationship with a second predetermined threshold; and
discreetly enacting a data protection response associated with data when the detected user interaction pattern is determined to indicate an interaction by an unauthorized user.

10. The method of claim 9, wherein said determining comprises:
comparing the detected user interaction pattern with an acceptable user interaction pattern to determine whether the detected user interaction pattern indicates an interaction by an unauthorized user.

11. The method of claim 10, further comprising:
receiving detected user interaction patterns with the user interface; and
processing the detected user interaction patterns to generate the acceptable user interaction pattern for the user interface.

12. The method of claim 10, wherein the user interface further comprises a keyboard, and the acceptable user interaction pattern for the keyboard includes at least one of an average typing speed range, an average typing speed for a particular word, or a predetermined typographical error.

13. The method of claim 10, wherein the user interface further comprises a touch screen, and the acceptable user interaction pattern for the touch screen includes at least one of an average touch area or an average touch pressure range.

14. A method in a computing device to protect data stored by the computing device, comprising:
enabling data to be selected, and a data sensitivity level, a data protection response, and a contextual trigger to be associated with the data;
receiving detected user interaction patterns with a user interface of the computing device, the detected user interaction patterns comprising a touch screen interaction that includes at least one of an average touch area or an average touch pressure range;
processing the detected user interaction patterns to generate an acceptable user interaction pattern for the user interface;
determining whether a detected user interaction pattern with the user interface indicates an interaction by an unauthorized user by comparison with the acceptable user interaction pattern; and
discreetly enacting the data protection response when the detected user interaction pattern is determined to indicate an interaction by an unauthorized user.

15. The method of claim 14, wherein the user interface further comprises a keyboard, and the acceptable user interaction pattern for the keyboard includes at least one of an average typing speed range, an average typing speed for a particular word, or a predetermined typographical error.

16. The method of claim 14, wherein the user interface further comprises a pointing device, and the acceptable user interaction pattern for the pointing device includes at least one of a movement of a pointer within a determined screen area or an amount of file and/or folder exploration less than a predetermined threshold.

17. The method of claim 14, wherein the data protection response comprises a hard delete such that data marked as sensitive is automatically deleted from the computing device without an option for recovery.

18. The method of claim 14, wherein the data protection response comprises a soft delete such that data marked as sensitive is automatically hidden from view by a user by deleting one or more links to a file that represents the data.

19. The method of claim 18, further comprising:
restoring the deleted one or more links from a safe location in storage.

20. The method of claim 14, wherein the data protection response comprises at least one of a hard delete, a soft delete, an alert provided to a user, a file being disabled from opening, closing an opened window displaying data marked as sensitive, or hiding an opened window displaying data marked as sensitive behind one or more other windows.

* * * * *